United States Patent [19]

Bernander et al.

[11] Patent Number: 5,225,151
[45] Date of Patent: Jul. 6, 1993

[54] CONTROL ROD FOR NUCLEAR REACTORS

[75] Inventors: Öjran Bernander, Västerås; Sven Eriksson, Skultuna; Lars Hallstadius; Ulf Sundström, both of Västerås, all of Sweden

[73] Assignee: ABB Atom AB, Västerås, Sweden

[21] Appl. No.: 795,482

[22] Filed: Nov. 21, 1991

[30] Foreign Application Priority Data

Nov. 26, 1990 [SE] Sweden ............................ 9003748

[51] Int. Cl.$^5$ ................................................ G21C 7/00
[52] U.S. Cl. ................................... 376/333; 376/327
[58] Field of Search .............................. 376/333, 327; 976/DIG. 118, DIG. 119, DIG. 123

[56]     References Cited
         U.S. PATENT DOCUMENTS

| 4,252,613 | 2/1981 | Jabsen ............... 376/439 |
| 4,631,165 | 12/1986 | Wilson et al. ........... 376/333 |
| 4,752,440 | 6/1988 | Ahlinder et al. ......... 376/333 |
| 4,826,630 | 5/1989 | Radford et al. .......... 252/478 |
| 4,888,150 | 12/1989 | Vesterlund ............. 376/333 |

Primary Examiner—Donald P. Walsh
Assistant Examiner—Meena Chelliah
Attorney, Agent, or Firm—Watson, Cole, Grindle & Watson

[57] ABSTRACT

In a control rod for nuclear reactors with elongated channels for boron carbide or other neutron-absorbing material which swells upon neutron irradiation, the neutron-absorbing material (20a), in at least some of the channels (18b), is provided with projecting portions (20a') or arranged in a casing with portions projecting towards the channel walls. Further, the projecting portions are adapted to form between them and the channel walls unfilled spaces (40) for taking up swelling neutron-absorbing material.

17 Claims, 3 Drawing Sheets

CONTROL ROD FOR NUCLEAR REACTORS

BACKGROUND OF THE INVENTION

The present invention relates to a control rod for nuclear reactors and which has elongated channels containing boron carbide or other neutron-absorbing material that swells upon neutron irradiation.

A known control rod of the mentioned kind includes a number of absorber plates in which powdered boron carbide is arranged in elongated, horizontal channels in the form of holes bored in the plates.

Other known control rods include, among other things, absorber plates in which powdered boron carbide is arranged in elongated, vertical channels in the form of empty spaces in tubes arranged adjacent to each other in the plates.

In known finger-type control rods, boron carbide is arranged in elongated, vertical channels in the form of empty spaces in tubes arranged in spaced relationship to each other.

When boron carbide is subjected to neutron irradiation, it absorbs neutrons and forms helium and lithium. This process causes the boron carbide to undergo swelling, which in turn may cause stress corrosion in the construction material around the channel where the boron carbide is located, and hence a risk of cracking. The risk of cracks in the construction material caused by stress corrosion increases with increased irradiation and increased swelling of the boron carbide. It is therefore important to take measures which counteract harmful consequences of the swelling.

SUMMARY OF THE INVENTION

According to the present invention, the harmful effects of the swelling of the neutron-absorbing material are eliminated, or at any rate considerably counteracted, while at the same time the invention makes it possible for the neutron-absorbing material to be kept in a fixed geometrical position in the channels and hence for the neutron absorbing effect of the control rod to be maintained at a predetermined value for a long time. The measures according to the present invention result in a considerable extension of the service life of the control rod.

According to the present invention, the favourable results are obtained by providing the neutron-absorbing material in at least some of the channels with portions projecting towards the channel walls, or arranging it in a casing with portions projecting towards the channel walls, which projecting portions form between them and the channel walls unfilled spaces for taking up swelling, neutron-absorbing material. Thus, of the by means of the invention, a well-defined space for the swelling of the neutron-absorbing material is obtained, which space is located outside the neutron-absorbing material.

According to an advantageous embodiment of the invention, the projecting portions are elongated, for example in the form of ridges, and extend in the longitudinal direction of the channels. Such a shape may prevent neutron-absorbing material, which has disintegrated, from accumulating in an unfavourable way. However, the projecting portions may, per se, consist of bumps arranged in spaced relationship to each other, with, for example, more or less circular cross sections in planes parallel to the channel walls. The projecting portions preferably have a cross section which decreases in a direction from the interior of the neutron-absorbing material towards the channel walls, in planes which are parallel to the channel walls. By such an embodiment, since the neutron capture takes place from the surface of the absorber material, the disintegration of the neutron-absorbing material will at the beginning be located primarily at the projecting portions, so that these are gradually weakened and disintegrate, permitting powder of disintegration products formed to accumulate between the projecting portions.

BRIEF DESCRIPTION OF THE DRAWINGS

The invention will be described in greater detail by way of examples with reference to the accompanying drawings.

DETAILED DESCRIPTION OF THE PREFERRED EMBODIMENTS

Figure 1:
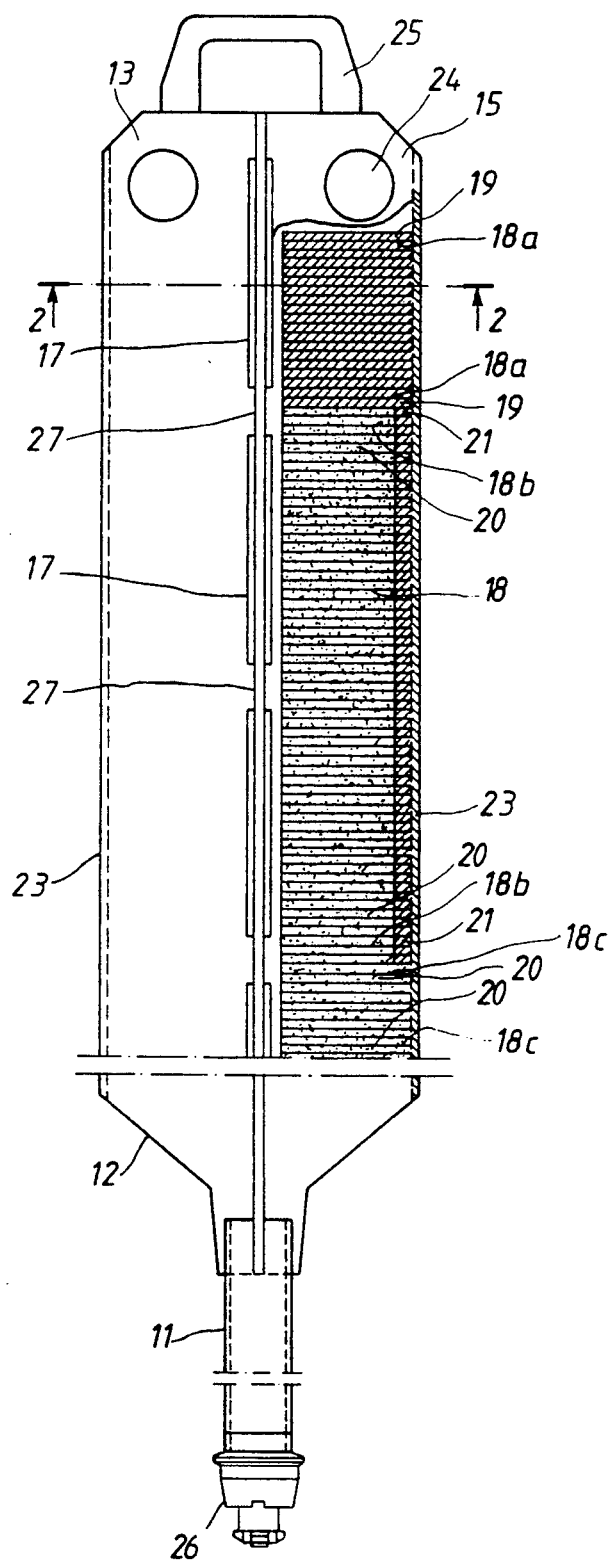
FIG. 1 shows aside view, partially in section, and of a control rod according to the present invention.
Figure 2:
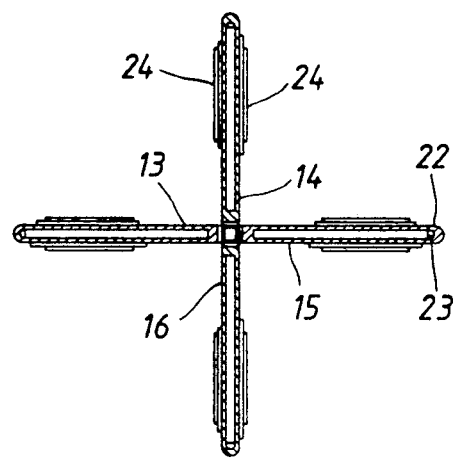
FIG. 2 shows a cross section through line 2—2 of FIG. 1.

The control rod shown in FIGS. 1 and 2 is substantially manufactured from stainless steel and consists of an absorber part 12 supported by a vertically arranged coupling bar 11. The absorber part consists of four absorber plates 13-16, which form a right-angled cross, the centre line of which coincides with that of the coupling bar. The absorber plates are provided at the centre with recesses 17 and connection pieces 27 and are welded to each other at the connection pieces and at a supporting filling piece of square cross section located adjacent the connection pieces. The plates are provided with a large number of bored channels 18 (18a-c). The uppermost channels 18a, which are most subjected to radiation, are filled 19 with rods of hafnium metal with a similar length as the channels. The channels 18b arranged thereunder are filled with boron carbide 20, arranged according to the present invention except as regards the furthermost part where a spring 21 of Inconel is arranged, which presses the boron carbide towards the channel bottom and is able to absorb the swelling of the boron carbide in the longitudinal direction of the channel. The spring 21 may be replaced by a plastically deformable element such as a slitted tube of a ductile metal. The channels 18c arranged at the bottom, where the irradiation is lowest, are filled in their entirety with conventional powdered boron carbide 20. That edge of each absorber plate which faces away from the centre line of the rod is provided with a slot 22, in which is arranged a bar 23. At least in the upper part the bar is suitably of hafnium metal. It may also in its entirety and at least in the lower part be of, for example, stainless steel. The springs 21 and the plastically deformable elements, respectively, may advantageously be welded to the bar. The application of the bar in the slot will be described in more detail in connection with an explanation of FIGS. 3-5. For guiding the control rod in the relatively narrow gaps between the fuel channels of the reactor, the upper part of the control rod is provided with guide pads 24 of Inconel. In addition, it is provided with a lifting handle 25 for handling the rod during insertion and replacement. The lower part of the rod is provided with a coupling head 26 over which the rod may be connected to a drive mechanism (control rod drive).

Figure 3:
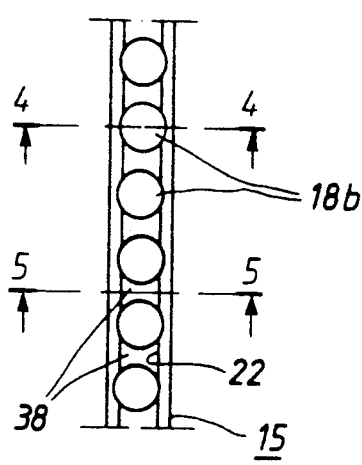
FIG. 3 shows a cross section, parallel to the centre line of the control rod, of an absorber plate included in the control rod, inside the edge of the absorber plate facing away from the centre line of the control rod.

FIG. 3 shows a number of the channels 18b in the absorber plate 15 as well as the slot 22. As is shown more clearly in FIGS. 4 and 5, the absorber plate has an edge part 30 which comprises a gas-tight edge 31, a longitudinal empty space 32 arranged inside the edge, and a longitudinal bar 23 which is arranged in the slot and has the same width as the slot and is provided with a longitudinal indentation 33 which constitutes a limiting wall for the space 32. The bar does not completely cover the orifices 34 of the channels in the bottom of the slot since its width is smaller than the diameter of the channels. This leads to the creation of a gap 35 between the bar and the side walls of the slot, where the channels are located, since the side walls of the slot make contact with the bar in the portions 38 (FIG. 3) where no channels are bored and, therefore, the side walls of the slot are thicker. Like the channels 18a and 18c, the channels 18b communicate openly with the space 32 by way of the gaps 35 such that gas formed upon irradiation of the absorber material may flow between the different channels in the plate and a pressure equalization be attained. Of course, the spring 21 permits flow of gas.

During the manufacture of an absorber plate, the channels 18 are bored from an edge on a plane-parallel plate. Thereafter, the slot 22 is cut out. After application of the neutron-absorbing material and, where applicable, the springs 21 in the channels 18, the bar 23 is placed in the slot and the side walls of the slot, which are straight from the start, are pressed against the bar and welded together at the end surfaces while forming a gas-tight edge 31. The weld joint is designated 37. The slot is sealed with weld joints also at its ends at the top and bottom of the absorber plate.

Figure 4:
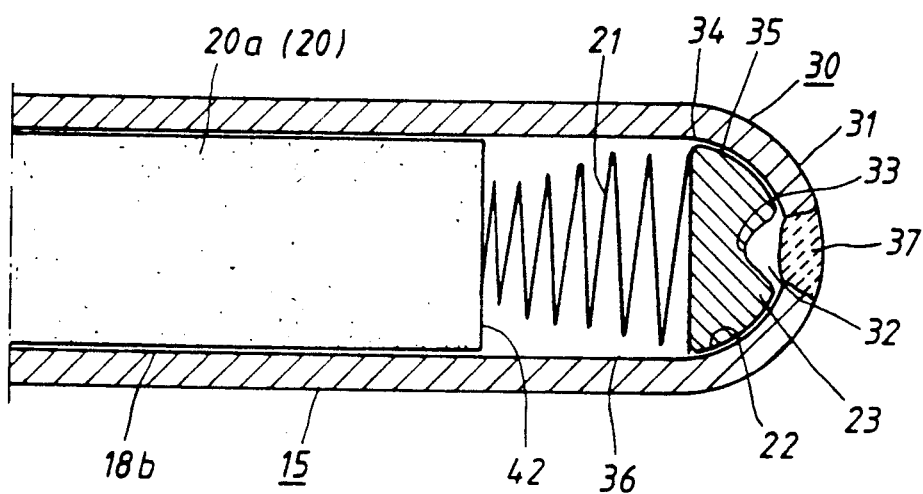
FIGS. 4 and 5 show two sections 4—4 and 5—5, respectively, perpendicular thereto.
Figure 5:
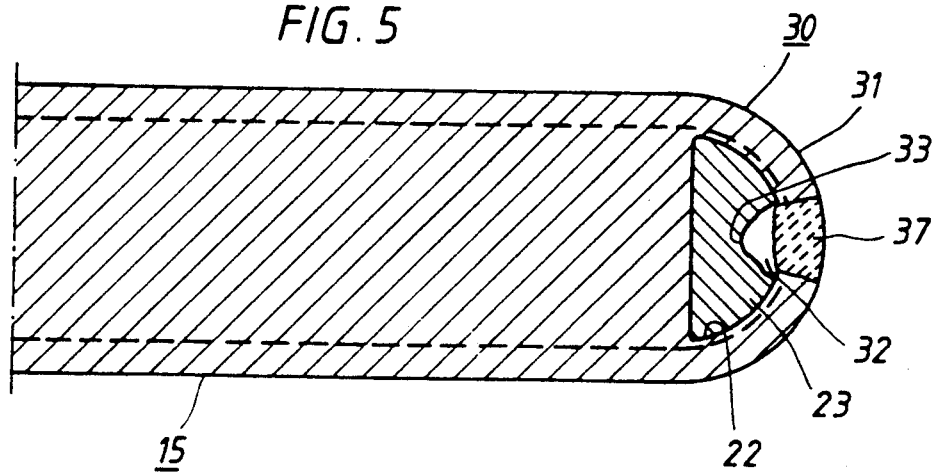
Figure 6:
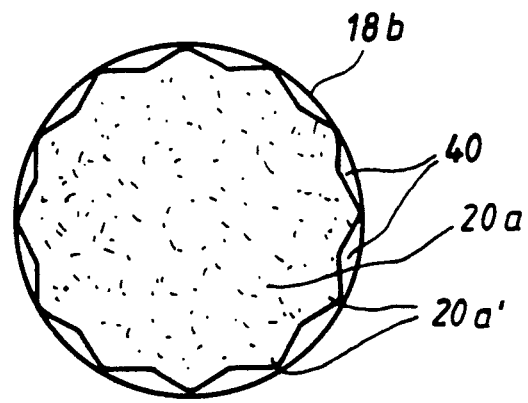
FIGS. 6-8 show cross sections of channels with neutron-absorbing material in various embodiments according to the present invention.
Figure 7:
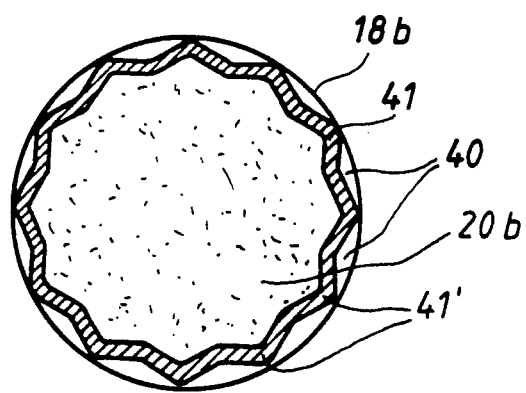

In the embodiment of the invention shown in FIG. 6, the neutron-absorbing material in the channels 18b consists of a number, for example four, of self-supporting bars 20a of boron carbide, arranged one after the other in the longitudinal direction of the channel (part of such a bar is also shown in FIG. 4), which are provided with projecting elongated portions 20a', which extend in the form of ridges in the longitudinal direction of the channels and are just as long as the bars themselves. Between the projecting portions and the channel walls there are unfilled spaces 40. The self-supporting bars may advantageously consist of sintered-together powder of boron carbide. Especially preferred are bars manufactured by isostatic pressing at a temperature required for sintering of the boron carbide, at least 1700° C., and at a pressure of at least 50 MPa. In this way a density of the bars amounting to more than 99% of the theoretical and the use of an optimum amount of boron carbide in an available channel space may be obtained. Other densities above 70% of the theoretical may also give excellent performance In the embodiment shown in FIG. 7, the neutron-absorbing material in the channels 18b consists of a loose powder 20b of boron carbide which is encapsulated in a casing in the form of a preformed capsule 41 of a ductile metallic material such as nickel, iron, titanium or zirconium with projecting elongated portions 41' which in the form of ridges run in the longitudinal direction of the channels along the entire extent of the powder in this direction and with transverse end walls, inter alia at such a surface, which is designated 42 in FIG. 4. The capsule is preferably punctured to let through helium gas developed. Between the projecting portions 41' and the channel walls there are unfilled spaces 40. Instead of arranging the powder in one capsule, it may be arranged in several, for example four, capsules which are arranged one after the other in the longitudinal direction of the channel and which are preferably punctured to let through helium gas formed. Instead of enclosing a loose powder in the capsule or capsules, there may be enclosed in the capsule or capsules one or more non-sintered compacted bodies of the powder, one or more sintered bodies in the form of bars of the powder, or one or more hot-isostatically pressed bodies in the form of bars. Also in those cases where the neutron-absorbing material consists of self-supporting bodies, such as sintered bodies or hot-isostatically pressed bodies, it may be advantageous to surround the bodies with a casing since such a casing keeps powder of disintegration products, separated from the bodies, in position. If the bodies are self-supporting, it is possible to apply the casing on the bodies in the form of a plasma-sprayed or flame-sprayed layer which is supported by the respective body.

Figure 8:
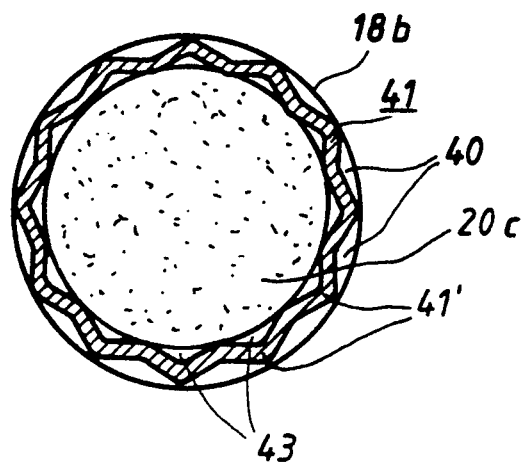

In the embodiment of the invention shown in FIG. 8, the neutron-absorbing material in the channels 18b consists of a number, for example four, of self-supporting bodies, arranged one after the other in the longitudinal direction of the channel, in the form of circular-cylindrical bars 20c of boron carbide. The bars are preferably sintered by heating at atmospheric pressure, by hot pressing in conventional tools or by isostatic hot pressing. The self-supporting bodies are enclosed in a casing in the form of a preformed capsule 41 of the same kind as that described with reference to FIG. 7. In the embodiment according to FIG. 8, unfilled spaces 43 occur also inside the capsule 41.

The boron carbide used in the example described above may be natural boron carbide, which normally has a content of the isotope B-10 of around 20 mole per cent. By using a boron carbide which is enriched with respect to the isosope B-10, so that its content of the isotope B-10 preferably constitutes at least 30 mole per cent of the total boron content, the used amount of boron carbode as well as its space requirement in the control rod can be reduced to obtain a certain control rod effect of the control rod, and an increased control rod effect may be attained with a certain amount of boron carbide and a given space therefor. Especially if the boron carbide is used in the form of a loose powder, it is of value to use a boron carbide which is enriched with respect to the isotope B-10. What has been stated above relating to boron carbide is also valid for other boron-containing neutron-absorbing materials.

The invention has been described in greater detail in connection with the use of boron carbide as neutron-absorbing material. The invention is also applicable to the use of other known neutron-absorbing materials such as other boron-containing materials, for example hafnium boride.

We claim:

1. A control rod for nuclear reactors comprising elongated channels containing boron carbide or other neutron-absorbing material which swells upon neutron irradiation, wherein the neutron-absorbing material in at least some of the channels is provided with portions projecting towards the channel walls; or arranged in a casing with portions projecting towards the channel walls, said projecting portions forming between them and the channel walls unfilled spaces for taking up swelling neutron-absorbing material.

2. A control rod according to claim 1, wherein the projecting portions are elongated and extend in the longitudinal direction of the channels.

3. A control rod according to claim 1, wherein the projecting portions have a cross section, decreasing from the interior of the neutron-absorbing material towards the channel walls, in planes which are parallel to the channel walls.

4. A control rod according to claim 1, wherein the neutron-absorbing material (20a) consists of one or more self-supporting bars.

5. A control rod according to claim 4, wherein the self-supporting bars consist of a sintered powder of the neutron-absorbing material.

6. A control rod according to claim 4, wherein the self-supporting bars consist of hot-isostatically pressed bodies of the neutron-absorbing material.

7. A control rod according to claim 1, wherein the neutron-absorbing material in a channel consists of a loose powder arranged in a casing in the channel.

8. A control rod according to claim 1, wherein the neutron-absorbing material in a channel consists of one or more bodies of compacted powder, arranged in a casing in the channel.

9. A control rod according to claim 1, wherein the casing consists of a preformed capsule in which the neutron-absorbing material is arranged.

10. A control rod according to claim 1, wherein the neutron-absorbing material consists of a self-supporting body on which a casing in the form of a layer supported by the body is arranged.

11. A control rod according to claim 1, wherein the casing consists of a ductile metallic material.

12. A control rod according to claim 1, wherein the neutron-absorbing material consists of a boron-containing material which is enriched with respect to the isotope B-10.

13. A control rod for nuclear reactors which includes walls that define a plurality of elongated channels for neutron absorbing material and an element comprising neutron-absorbing material which swells when irradiated in one of said elongated channels, said element having an uneven exterior surface and dimensioned such that a space is provided between said element and the wall of said one channel to allow for swelling of said neutron-absorbing material when irradiated.

14. A control rod according to claim 13, wherein said element consists of said neutron-absorbing material.

15. A control rod according to claim 13, wherein said element consists of a capsule containing neutron-absorbing material in powder form.

16. A control rod according to claim 13, wherein said element consists of a capsule containing a plurality of bodies of neutron-absorbing material.

17. A control rod according to claim 13, wherein said one channel includes a plurality of said elements comprising said neutron-absorbing material.

* * * * *

UNITED STATES PATENT AND TRADEMARK OFFICE
CERTIFICATE OF CORRECTION

PATENT NO. : 5,225,151
DATED : July 6, 1993
INVENTOR(S) : Bernander et al.

It is certified that error appears in the above-identified patent and that said Letters Patent is hereby corrected as shown below:

ON THE TITLE PAGE:

[75] Inventors: Örjan Bernander, Västerås; Sven Eriksson, Skultuna; Lars Hallstadius; Ulf Sundström, both of Västerås, all of Sweden Signed and Sealed this Twenty-fifth Day of January, 1994

Attest:

BRUCE LEHMAN

Attesting Officer   Commissioner of Patents and Trademarks